(12) United States Patent
Yamaguchi et al.

(10) Patent No.: US 12,556,181 B2
(45) Date of Patent: Feb. 17, 2026

(54) SUPERCONDUCTING QUANTUM CIRCUIT APPARATUS AND CONTROL METHOD THEREFOR

(71) Applicant: NEC Corporation, Tokyo (JP)

(72) Inventors: Aiko Yamaguchi, Tokyo (JP); Tomohiro Yamaji, Tokyo (JP); Ryoji Miyazaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 40 days.

(21) Appl. No.: 18/783,742

(22) Filed: Jul. 25, 2024

(65) Prior Publication Data

US 2025/0125801 A1    Apr. 17, 2025

(30) Foreign Application Priority Data

Jul. 28, 2023    (JP) .................................. 2023-123551

(51) Int. Cl.
  *H03K 17/92*    (2006.01)
  *G06N 10/40*    (2022.01)

(52) U.S. Cl.
  CPC ............ *H03K 17/92* (2013.01); *G06N 10/40* (2022.01)

(58) Field of Classification Search
  CPC ...................................................... H03K 17/92
  USPC ............................................................ 327/528
  See application file for complete search history.

(56) References Cited

U.S. PATENT DOCUMENTS

| | | |
|---|---|---|
| 2018/0240034 A1 | 8/2018 | Harris |
| 2019/0294991 A1 | 9/2019 | Filipp et al. |
| 2021/0201188 A1 | 7/2021 | Yamaji et al. |
| 2025/0272590 A1* | 8/2025 | Hashimoto ............ G06N 10/40 |

FOREIGN PATENT DOCUMENTS

| | | |
|---|---|---|
| JP | 2017-073106 A | 4/2017 |
| JP | 2018-533106 A | 11/2018 |
| JP | 2021-108308 A | 7/2021 |
| JP | 2021-516389 A | 7/2021 |

OTHER PUBLICATIONS

Wolfgang Lechner, Philipp Hauke, Peter Zoller, "A quantum annealing architecture with all-to-all connectivity from local interactions", Science Advances Oct. 2015.

Shruti Puri, et al., "Quantum annealing with all-to-all connected nonlinear oscillators", Nature Communications 8, 15785 (2017).

* cited by examiner

*Primary Examiner* — Tomi Skibinski

(74) *Attorney, Agent, or Firm* — Sughrue Mion, PLLC

(57) ABSTRACT

A superconducting quantum circuit apparatus includes: a coupler; a plurality of coupling ports; a plurality of qubits coupled to the coupler via the plurality of coupling ports, respectively; and a reserve port provided as a spare coupling port to be coupled to the coupler, separately from the plurality of coupling ports.

12 Claims, 11 Drawing Sheets

SUPERCONDUCTING QUANTUM CIRCUIT APPARATUS AND CONTROL METHOD THEREFOR

FIELD

Cross Reference to Related Applications

This application is based upon and claims the benefit of the priority of Japanese patent application No. 2023-123551, filed on Jul. 28, 2023, the disclosure of which is incorporated herein in its entirety by reference thereto.

The present invention relates to a superconducting quantum circuit apparatus and a control method therefor.

BACKGROUND

In a quantum annealer of an LHZ (abbreviation of initials of three proposers, Lechner, Hauke, and Zoller) scheme configured using Josephson Parametric Oscillators (JPOs), a Josephson junction or a non-linear resonator including the Josephson junction can be used as a four-body coupler (reference may be made to Non Patent Literature (NPL), 1 or 2). In the LHZ scheme, a physical bit represents a product of two logical bits. By arranging physical bits regularly, coupling neighboring physical bits with a four-body coupler and applying a local magnetic field to each physical bit, it is possible to implement an Ising machine with all-to-all connections among the logical bits. JPO is a superconducting non-linear resonator that includes a superconducting quantum Interference device (SQUID). Parametric oscillation occurs at a frequency half of the pump signal in the JPO, when a microwave (pump signal) with almost twice a resonance frequency of the JPO, is applied to the SQUID of the JPO. This parametric oscillation takes one of two oscillation states whose phases relative to the pump signal differ by T. These two oscillation states may be treated as two levels of a qubit (quantum bit).

[NPL 1] Wolfgang Lechner, Philipp Hauke, Peter Zoller, "A quantum connectivity from local annealing architecture all-to-all interactions", Science Advances 2015 October
  [NPL 2] Shruti Puri, et. al., "Quantum annealing with all-to-all connected nonlinear oscillators", Nature Communications 8, 15785 (2017)

SUMMARY

In a quantum annealer (annealing machine) including a JPO(s) as a qubit(s), there may be a JPO which fails to parametrically oscillate due to a manufacturing yield or the like, thus becoming a missing qubit (missing bit). In addition, there may be a case where oscillation of some JPOs needs to be paused to suppress a noise source, for example.

From above, there may be a case where a part of qubits coupled to a coupler is/are stopped due to missing thereof, and/or for the sake of cessation of the qubit(s) in the quantum annealer.

Accordingly, it is an object of the present disclosure to provide a superconducting quantum circuit apparatus and a control method, each enabling to maintain a constraint on qubits that are not stopped and coupled via a coupler, even when a qubit(s) is (are) stopped.

According to one of aspects of the present disclosure, there is disclosed a superconducting quantum circuit apparatus, including: a coupler; a plurality of coupling ports; a plurality of qubits coupled to the coupler via the plurality of coupling ports, respectively; and a reserve port provided, as a spare coupling port to be coupled to the coupler, separately from the plurality of coupling ports.

According to one of aspects of the present disclosure, there is provided a control method for a superconducting quantum circuit that includes: a coupler; a plurality of coupling ports; and a plurality of plurality of qubits coupled to the coupler via the plurality of coupling ports, respectively, the method including:
  arranging a reserve port, as a spare coupling port to be coupled to the coupler, separately from the plurality of coupling ports; and
  supplying a signal to the reserve port, instead of to the qubit.

According to the present disclosure, it is possible to maintain a constraint on qubits that are not stopped and coupled via a coupler, even when a qubit(s) is (are) stopped.

EXAMPLE EMBODIMENTS

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples. It is noted that in the disclosure, the expression "at least one of A and B" means A, B, or (A and B). The term expressed as "--(s)" includes both singular and/or plural form. In a quantum annealing machine, when there is a missing bit due to stoppage, etc., not only the missing bit itself cannot be used, but also normal qubits that are not missing may be affected such that a constraint needed for four-body coupling, might not work. The reason for this is that a four-body interaction might not work on a coupler to which the missing bit is coupled. Although the above issue is just one example, an apparatus and a method of the present disclosure may contribute to improve availability and fault-tolerance of a superconducting quantum circuit apparatus in various situations not limited to the above.

An example superconducting quantum circuit apparatus of the present disclosure includes a reserve coupling port (reserve port) for at least one qubit of four qubits coupled by a coupler. The reserve port may be coupled to the coupler in place of the at least one qubit. When the at least one qubit is missing, a signal to the at least one qubit (the missing qubit) is made to be supplied to the reserve port in place of the missing qubit, thereby allowing the four qubits including the missing qubit to implement a four-body interaction via the coupler. This enables to maintain a constraint on the qubits that are not missing. When the qubit is not missing and there is no need to stop the qubit, the reserve port may be electrically open or may be connected to ground directly or via a capacitor.

Figure 1:
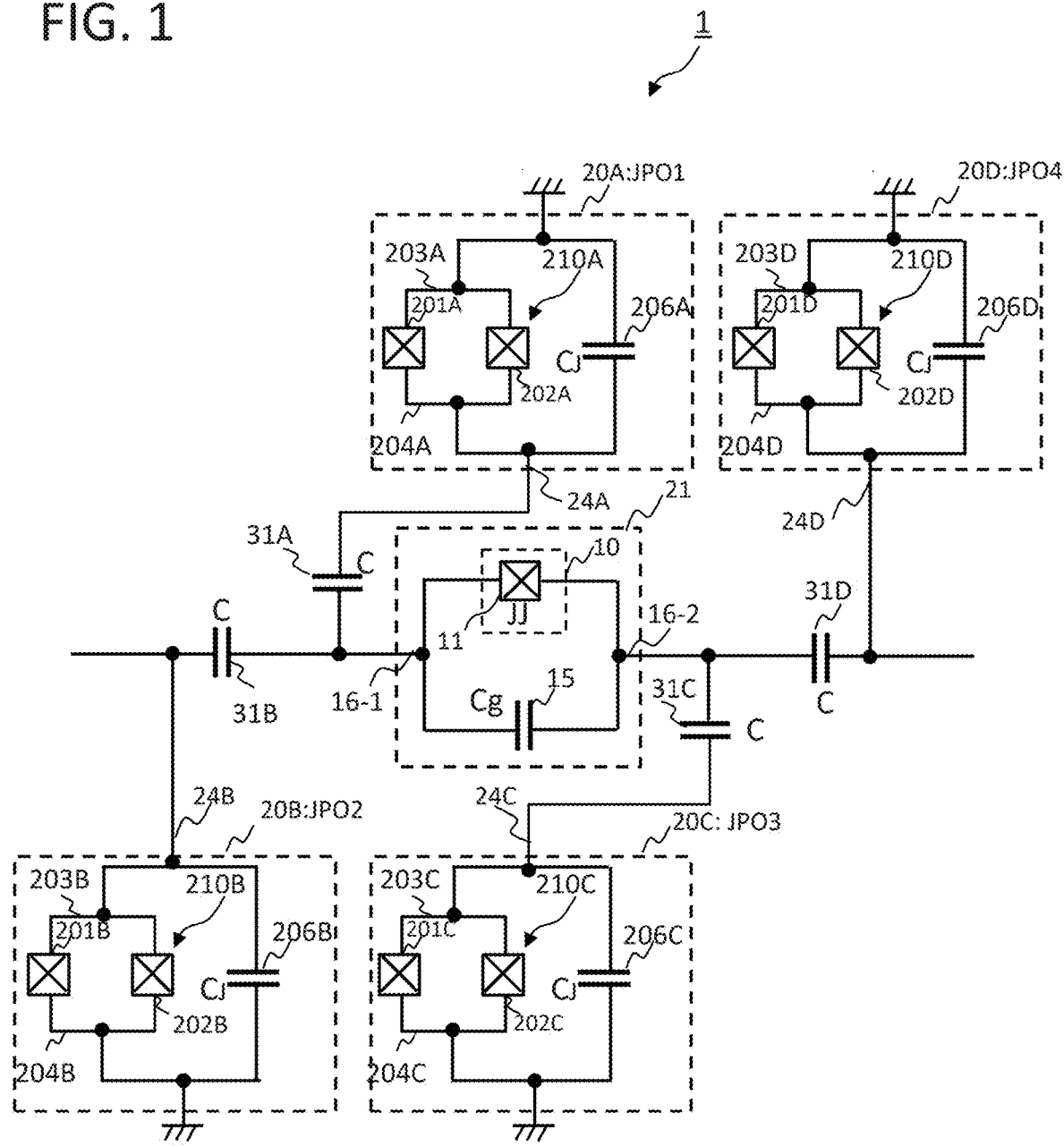
FIG. 1 is a diagram schematically illustrating an example of a circuit configuration of a related art.
Figure 2:
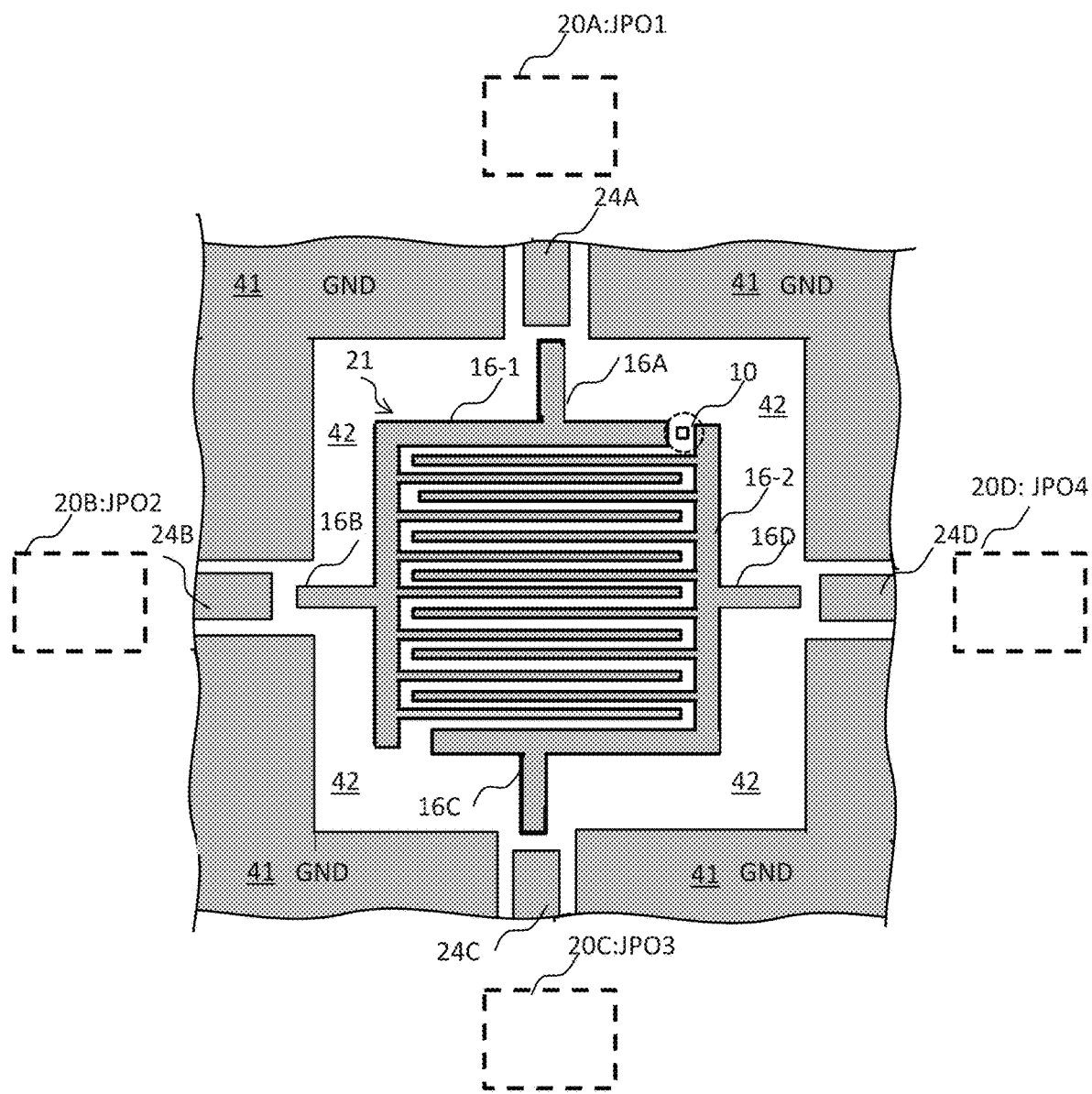
FIG. 2 is a diagram schematically illustrating an example of a layout of the related art.

The following first outlines a coupler for four-body interaction using a typical JPO as a premise of the examples of the present disclosure. FIG. 1 and FIG. 2 are diagrams to clarify features (e.g., newly added elements) of examples of the present disclosure (e.g., illustrated in FIG. 4, FIG. 5, etc.), which will be described later.

FIG. 1 is a diagram illustrating an example of a configuration of a coupler that couples neighboring four JPOs by a four-body interaction which are a unit cell (also called a plaquette) in an LHZ scheme. Referring to FIG. 1, a superconducting quantum circuit 1 includes four JPOs (JPO1 (20A) to JPO4 (20D)) and a coupler 21. JPO1 (20A) to the JPO4 (20D) are capacitively coupled to the coupler 21 via capacitors 31A to 31D, respectively.

The coupler 21 includes a non-linear element (non-linear inductor) 10 arranged between a first electrode 16-1 and a second electrode 16-2. The non-linear element 10 includes a Josephson junction (JJ) 11. A capacitor 15 is connected in parallel to the non-linear element 10.

JPO1 (20A) to the JPO4 (20D) include SQUIDs (SQUID loops) 210A to 210D and capacitors 206A to 206D, respectively. SQUIDs 210A to 210D include, first superconducting parts 203A to 203D, first Josephson junctions 201A to 201D, second superconducting parts 204A to 204D, and second Josephson junctions 202A to 202D, connected in a loop, respectively. Capacitors 206A to 206D are connected between the first superconducting parts 203A to 203D and the second superconducting parts 204A to 204D, respectively. The second superconducting parts 204A to 204D are connected to ground. Coupler connection parts (coupling ports) 24A and 24B of JPO1 (20A) and JPO2 (20B) are connected to one end of the coupler 21 via capacitors 31A and 31B, respectively. Coupler connection parts (coupling ports) 24C and 24D of JPO3 (20C) and JPO4 (20D) are connected to the other end of the coupler 21 via capacitors 31C and 31D, respectively. Each of JPO1 (20A) to JPO4 (20D) includes a magnetic field application part (not shown). A pump signal (e.g., microwave current and DC bias current) supplied from a pump line (not shown) generates a magnetic flux that penetrates into each of SQUID loops 210A to 210D. In FIG. 1, each capacitance of the capacitors 206A to 206D of JPO1 (20A) to JPO4 (20D) is denoted as $C_J$, a capacitance of the capacitor 15 of the coupler 21 is denoted as $C_g$, and each capacitance of the capacitors 31A to 31D is denoted as C.

FIG. 2 is a diagram schematically illustrating an example (a non-limiting example) of a coupler 21 and its neighboring wiring pattern (layout) in a wiring layer on a substrate of a quantum chip. The coupler 21 in FIG. 2 corresponds to the coupler 21 in FIG. 1. The coupler 21, a ground plane 41 (ground pattern), JPOs 20A to 20D, etc., are formed in the wiring layer on the substrate. The coupler 21 is surrounded by the ground plane 41 (GND) through a gap 42 of a predetermined width and the substrate surface is exposed at the gap 42. The wiring layer is made of a superconducting material, and the ground plane 41, the coupler 21, the JPOs 20A to 20D, etc. are formed by a wiring process (photoresist coating, exposure/developing, etching, photoresist stripping, and cleaning, etc.) for a superconducting film deposited on a substrate surface.

In the example illustrated in FIG. 2, the coupler 21 includes a first electrode 16-1 of a substantially L-shape and a second electrode 16-2 of a substantially inverted L-shape, which are arranged opposing each other. Each of the first electrode 16-1 and the second electrode 16-2 has an interdigital structure in which comb teeth are alternately protruded from side members, respectively, toward the other side. Opposing parts 16A and 16B are extended from a top member and the side member of the first electrode 16-1, respectively. End portions of the opposing parts 16A and 16B and end portions of coupler connection parts (coupling ports) of JPO1 (20A) and JPO2 (20B) are arranged opposing and spaced apart from each other, respectively to be coupled capacitively (corresponding to the capacitors 31A and 31B in FIG. 1). Opposing parts 16C and 16D are extended from a bottom member and the side member of the second electrode 16-2, respectively. End portions of the opposing parts 16C and 16D and end portions of coupler connection parts (coupling ports) of JPO3 (20C) and JPO4 (20D) are arranged opposing and spaced apart from each other, respectively to be coupled capacitively (corresponding to the capacitors 31C and 31D in FIG. 1). A non-linear element 10 is disposed between an end portion of the top member of the first electrode 16-1 and an end portion of the side member of the second electrode 16-2, which is facing the end portion of the top member.

Silicon may be used as a substrate. An electronic material such as sapphire or a compound semiconductor material (group IV, group III-V and group II-VI) may also be used. The substrate maybe preferably a single crystal but may be a polycrystalline or amorphous. As a material of a superconducting line, Nb (niobium) or Al (aluminum) may be used, though not limited thereto. Any metal that becomes superconductive at an extremely low (cryogenic) temperature may be used, such as niobium nitride, indium (In), lead (Pb), tin (Sn), rhenium (Re), palladium (Pd), titanium (Ti), molybdenum (Mo), tantalum (Ta), tantalum nitride, and an alloy containing at least one of the above metals. A superconducting quantum circuit is arranged in a temperature environment of, for example, about 10 mK (millikelvin) achieved by a refrigerator, for use under superconductivity operation.

A Hamiltonian of a circuit illustrated in FIG. 1 is expressed as follows (regarding its derivation, reference may be made to NPL 2).

$$H = \sum_{i=1}^{4} H_{JPOi} - g^{(4)}\left(a_1^\dagger a_2^\dagger a_3 a_4 + a_1 a_2 a_3^\dagger a_4^\dagger\right) - \quad (1)$$

$$\left(\Sigma_{k=1}^{3} \Sigma_{l=k+1}^{4} g_\chi^{(k,l)} a_k^\dagger a_k a_l^\dagger a_l\right) + H_{coupler}$$

In a first term of a right side, $H_{JPOi}$ is a Hamiltonian of an i-th JPO alone.

A second term is a term of the four-body interaction among JPOs, where $a_i^+$, $a_i$ are a creation operator and an annihilation operator of the i-th JPO, respectively and $g^{(4)}$ is a coefficient of the four-body interaction and proportional to an energy $E_J$ of the Josephson junction in the coupler 21 and $g_1 g_2 g_3 g_4/(\Delta_1 \Delta_2 \Delta_3 \Delta_4)$. Here, $g_i$ is a coupling constant with the Josephson junction JJ of the coupler 21 in the i-th JPO, and $\Delta_i$ is a difference between a resonance frequency $\omega_i$ of the i-the JPO and a resonance frequency $\omega_c$ ($\Delta_i = \omega_c - \omega_i$). The resonance frequency $\omega_c$ is defined by capacitance and inductance of the Josephson junction 11 of the coupler 21. A third term is a term corresponding to a cross Kerr interaction (interaction between $a_k^+ a_k^+$ and $a_l^+ a_l$). Coefficient $g^{(k,l)}_\chi$ is proportional to $E_j$ and $g_k^2 g_l^2/(\Delta_k^2 \Delta_l^2)$. $(g_k^2/\Delta_k^2)a_k^\dagger a_k$ corresponds to a frequency shift of a JPO mode due to off-resonant coupling with the Josephson junction JJ in the coupler 21. The last term $H_{coupler}$ is a Hamiltonian of the coupler 21 alone.

The following describes an example in which the JPO4 (20D) is missing in the circuit illustrated in FIG. 1. In this example, the JPO4 (20D) is assumed to be disabled to perform Josephson parametric oscillation any more due to short circuit in the SQUID 210D of the JPO4 (20D) and/or disconnection in the pump line of the JPO4. In this case, since an expected value of $a_4^\dagger a_4$ is 0, the four-body interaction term (the second term on the right side of Equation (1)) becomes 0, and the four-body interaction does not work. According to the present disclosure, a port (termed as a reserve port) configured to transmit a signal to the coupler 21 is arranged as a substitute for the missing qubit (JPO4). By supplying a signal to the reserve port, a four-body interaction is made effective via the coupler 21 to maintain constraint on qubits that are not missing.

An energy (Hamiltonian) of an Ising model for N logical bits is expressed as follows.

$$H_{logical} = \sum_{i=1}^{N} \sum_{j<i}^{N} J_{ij} \sigma_z^{(i)} \sigma_z^{(j)} + \sum_{i=1}^{N} b_i \sigma_z^{(i)} \qquad (2)$$

where, $J_{ij}$ is a coupling coefficient (interaction matrix) for two-body interaction,
bi is a parameter corresponding to a local magnetic field, and $\sigma_z^{(i)}$ (i=1~N) is an i-th Pauli spin matrix Oz.

As described above, for all-to-all connections of N logical bits, a product of two logical bits is represented by one physical bit in the LHZ scheme. N logical bits (logical qubits) are expanded to K=N (N−1)/2 physical bits (physical qubits), and the Hamiltonian Hp is expressed as follows:

$$H_p = \Sigma_{i,j} J_{i,j} \tilde{\sigma}_z^{(i,j)} - C \Sigma_{(i,j,k,l)} \tilde{\sigma}_z^{(i,j)} \tilde{\sigma}_z^{(k,j)} \tilde{\sigma}_z^{(k,l)} \tilde{\sigma}_z^{(i,l)} \qquad (3)$$

In Equation (3), $\tilde{\sigma}_z^{(i,j)}$ is a Pauli spin matrix $\sigma_z$ of a physical bit. In the following, since only z component of the Pauli spin matrix is dealt, $\tilde{\sigma}_z^{(i,j)}$ is discussed as a c number that can take ±1. The same applies to the logical bit $\sigma_z^{(i)}$ corresponding to the physical bit.

The first term on a right side: $\Sigma_{i,j} J_{i,j} \tilde{\sigma}_z^{(i,j)}$ may be expressed as $\Sigma_k {}^K J_k \tilde{\sigma}_z^{(k)}$, where the vector $J_k$ runs over all K=N (N−1)/2 elements of interaction matrix $J_{ij}$ in Equation (2). $J_k$ is a local magnetic field applied to the physical bit $\tilde{\sigma}_z^{(k)}$. The second term on a right side denotes a constraint, where <i,j,k,l> is an index of the Pauli spin matrix of four physical bits of a plaquette to be under constraint.

Four-body interaction is derived from a closed cycle. A condition for a closed cycle is given below.
The physical bit $\tilde{\sigma}_z^{(i,j)}$ is a product of logical bits $\sigma_z^{(i)}$ and $\sigma_z^{(j)}$.

$$\tilde{\sigma}_z^{(i,j)} = \sigma_z^{(i)} \sigma_z^{(j)} \qquad (4)$$

A product of the four physical bits in the closed cycle is given as follows.

$$\tilde{\sigma}_z^{(i,j)} \tilde{\sigma}_z^{(j,k)} \tilde{\sigma}_z^{(k,l)} \tilde{\sigma}_z^{(l,i)} = \sigma_z^{(i)} \sigma_z^{(j)} \sigma_z^{(j)} \sigma_z^{(k)} \sigma_z^{(k)} \sigma_z^{(l)} \sigma_z^{(l)} \sigma_z^{(i)} = 1 \qquad (5)$$

Figure 3A:
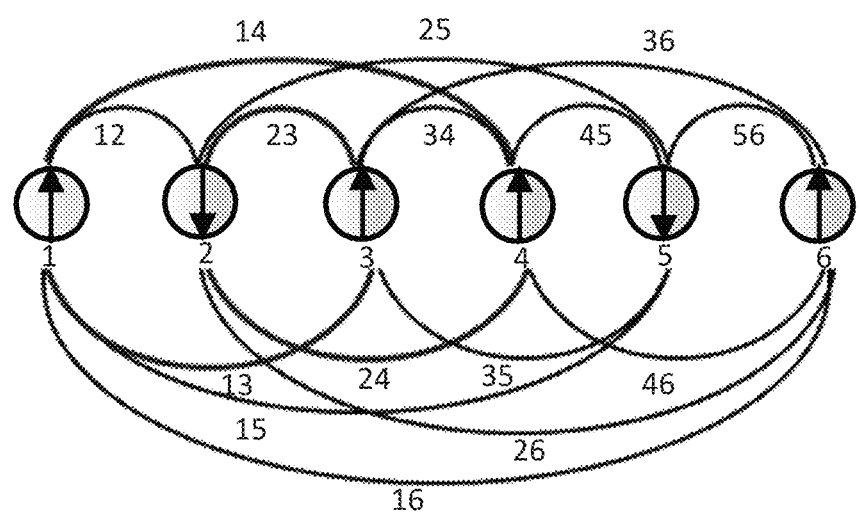
FIG. 3A is a diagram illustrating the related art.
Figure 3B:
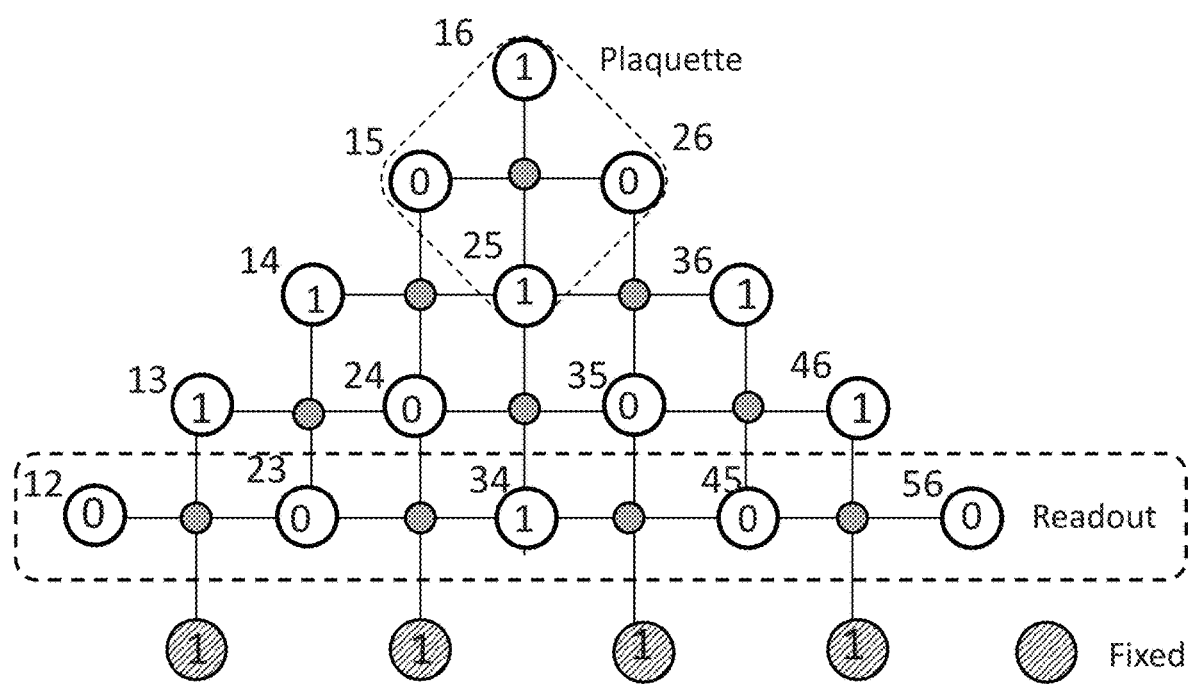
FIG. 3B is a diagram illustrating the related art.

In the Equation (5), the same index appears twice, resulting to be always 1. In FIG. 3A, for a closed loop of length 4 of couplings of two logical bits: $\sigma_z^{(1)} \sigma_z^{(3)} \rightarrow \sigma_z^{(2)} \sigma_z^{(3)} \rightarrow \sigma_z^{(2)} \sigma_z^{(4)} \rightarrow \sigma_z^{(1)} \sigma_z^{(4)}$, the number of physical bits of 1 in the four physical bits $\tilde{\sigma}_z^{(1,3)}$, $\tilde{\sigma}_z^{(2,3)}$, $\tilde{\sigma}_z^{(2,4)}$, $\tilde{\sigma}_z^{(1,4)}$ must be even. In a plaquette, the number of physical bits of a value 0 is 0, 2 or 4. This constraint may be configured such that for an index distance s=|i−j| of a logical bit, a closed loop of a plaquette includes four connections: one with index distance s, two with s+1, and one with s+2. In this case, for example, in the plaquette represented as $\tilde{\sigma}_z^{(1,3)}$, $\tilde{\sigma}_z^{(2,3)}$, $\tilde{\sigma}_z^{(2,4)}$, $\tilde{\sigma}_z^{(1,4)}$, the connection with index distance s=1 is $\tilde{\sigma}_z^{(2,3)}$, the connections with index distance s+1=2 are $\tilde{\sigma}_z^{(1,3)}$ and $\tilde{\sigma}_z^{(2,4)}$, the connection with index distance s+2=3 is $\tilde{\sigma}_z^{(1,4)}$. Referring to FIG. 3B, N=6 logical bits are mapped to 15 physical bits, and a block with s=1 is placed in a bottom row, a block with s=2 in the next row, and so on up to a block with s=N−2. K physical qubits are arranged in a pyramid shape. In FIG. 3B, four blocks are stacked from s=1 to s=N−2=4. (N−2) physical bits fixed to 1 are connected to the bottom row of the pyramid.

Figure 4:
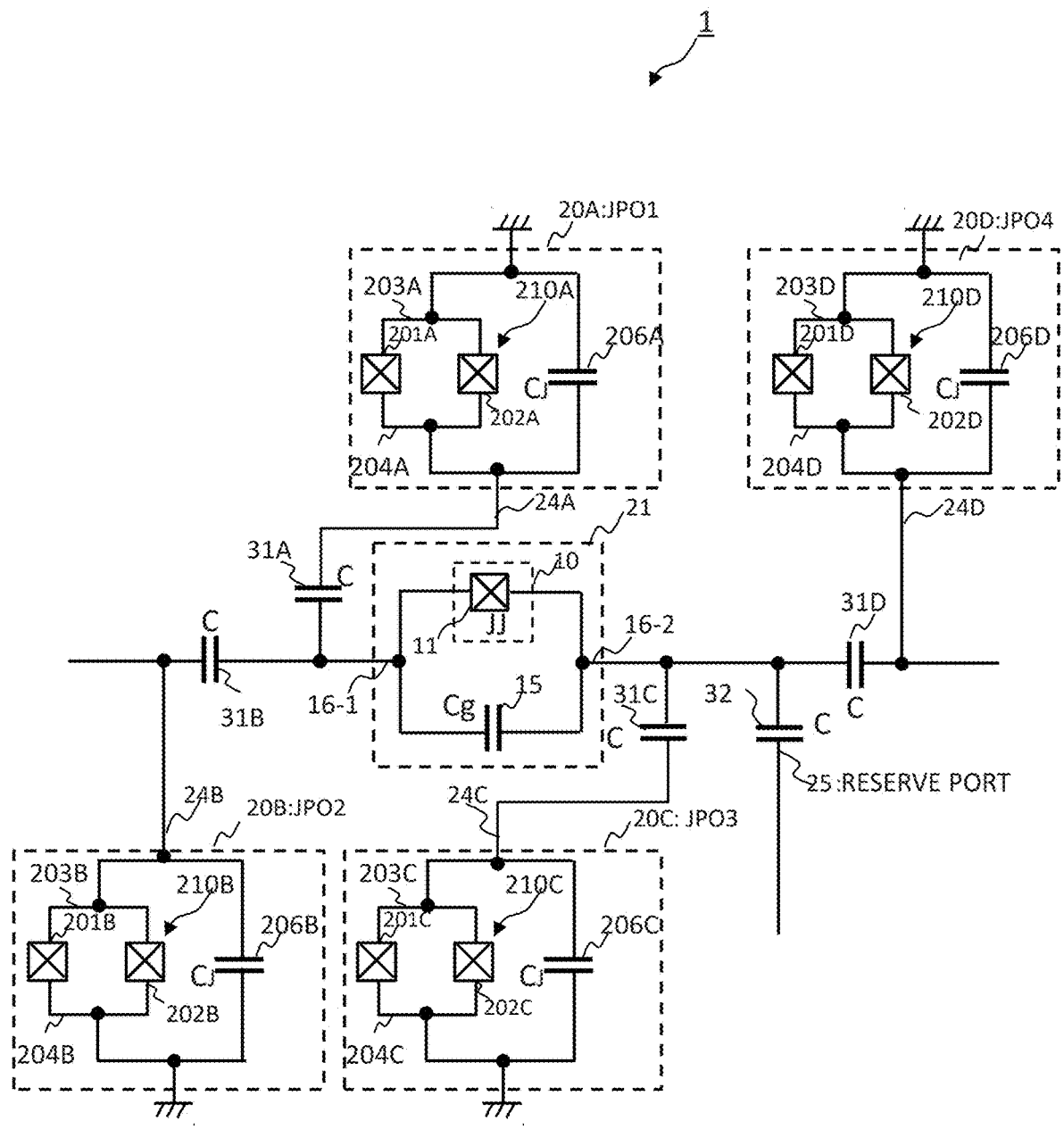
FIG. 4 is a diagram schematically illustrating one of examples of a circuit configuration of the present disclosure.

FIG. 4 is a diagram schematically illustrating a configuration of one of example circuits of the present disclosure. FIG. 4 corresponds to FIG. 1. In FIG. 4, description of elements that correspond to those in FIG. 1 is omitted to avoid duplication. Referring to FIG. 4, the superconducting quantum circuit 1 includes another coupling port 25 (termed as a "reserve port") for JPO4 (20D) among JPO1 (20A) to the JPO4 (20D), separately from the coupler connection part (coupling port) 24D of JPO4 (20D). The reserve port 25 is provided as a spare coupling port to the coupler 21. JPO1 (20A), JPO2 (20B), JPO3 (20C) and JPO4 (20D) implement a four-body interaction via the coupler 21. The reserve port 25 is capacitively coupled to the second electrode 16-2 of the coupler 21 via a capacitor 32. The coupler connection parts (coupling ports) 24C and 24D of the JPO3 (20C) and the JPO4 (20D) are capacitively coupled to the second electrode 16-2 via the capacitors 31C and 31D, respectively. The capacitor 32 is connected to the capacitors 31C and 31D in parallel with each other.

When JPO4 (20D) is missing due to failure or other reasons, or when JPO4 (20D) needs to be stopped, a signal (microwave) is supplied to the reserve port 25 from a signal source (microwave signal generator; not shown). The reserve port 25 functions as a substitute for JPO4 (20D), as a result of which JPO1 (20A), JPO2 (20B) and JPO3 (20C) are effectively four-body coupled via the coupler 21. More specifically, when JPO4 (20D) is missing (or needs to be stopped), a signal (may be termed as "reserve signal") with a frequency which is a half of the frequency $\omega_p$ of the pump signal of JPO4 (20D) is supplied to the reserve port 25, without parametric oscillation of JPO4 (20D). In this case, a Hamiltonian corresponding to that given by Equation (1) is given as follows.

$$H = \sum_{i=1}^{4} H_{JPO\,i} + E_0 (a_4^\dagger + a_4) - \qquad (6)$$

-continued $$g^{(4)}(a_1^\dagger a_2^\dagger a_3 a_4 + a_1 a_2 a_3^\dagger a_4^\dagger) - (\Sigma_{k=1}^3 \Sigma_{l=k+1}^4 g_X^{(k,l)} a_k^\dagger a_k a_l^\dagger a_l) + H_{coupler}$$

The right side of Equation (6) includes terms on the right side of Equation (1) plus a reserve term $$E_0(a_4^\dagger + a_4),$$

where $E_o$ is a strength of a single photon drive supplied to the reserve port 25. Thus, expected values of the creation and annihilation operators $a_4^\dagger$ and $a_4$ are not 0. As a result, even when JPO4 (20D) is missing, a third term in Equation (6) for four-body interaction is not 0.

By supplying a signal (single photon drive) to the reserve port 25, a four-body interaction coupling among the JPO1, the JPO2, the JPO3, and the missing JPO4 is realized in a pseudo-realistic manner via the coupler 21. This indicates that Equation (5), which is a constraint on four physical bits (JPOs) in a closed cycle, is satisfied, and thus the constraints on the non-missing JPO1, JPO2, and JPO3 can be maintained. The larger the number of qubits and the closer the coupling between qubits to all-to-all connections in the quantum annealing machine, the larger scaled and the more complex combinatorial optimization problems can be solved. According to examples of the present disclosure, a missing bit may be compensated with a signal supplied from a reserve port. This makes it possible to maintain an all-to-all connection configuration in the quantum annealing machine, thus enhancing fault tolerance (or resilience).

When there is no missing JPO in the four JPOs of the plaquette, a strength (coupling strength) of a four-body interaction can be modulated by a combination of phases of pump signals suppled respectively to the JPO1, the JPO2, the JPO3, and the JPO4 (20A, 20B, 20C and 20D). When pump signals of frequencies $\omega_{p,1}$, $\omega_{p,2}$, $\omega_{p,3}$, $\omega_{p,4}$ and phases $\theta_{p,1}$, $\theta_{p,2}$, $\theta_{p,3}$, $\theta_{p,4}$ are supplied to pump lines of JPO1, JPO2, JPO3 and JPO4, respectively, the second term on the right side of Equation (1) is given as follows.

$$g^{(4)} \exp\left\{-i \frac{(\theta_{p,3} + \theta_{p,4} - \theta_{p,1} - \theta_{p,2})}{2}\right\}(a_1^\dagger a_2^\dagger a_3 a_4 + a_1 a_2 a_3^\dagger a_4^\dagger) \quad (7)$$

Therefore, an effective coupling strength can be adjusted by adjusting a relative phase of a pump signal supplied to at least one of the four JPOs (JPO1 to JPO4).

In Equation (6), a strength of $E_0$ is determined by a power of the reserve signal, a capacitive coupling of the reserve port 25 and a capacitive coupling of a signal port of the JPO (JPO4 or JPO3 in the example illustrated in FIG. 4). When the capacitive coupling of the reserve port 25 is strong, a photon loss rate of the JPO might be increased through the reserve port 25. Therefore, a strength of a capacitive coupling between the reserve port 25 and a JPO (e.g., JPO4) is to be about the same or weaker (smaller) than that between the JPO and a signal port of the JPO (e.g., a signal port 26D of the JPO4 described later with reference to FIG. 6). Accordingly, a capacitance (a sum of the capacitor 32 and the capacitor 31D in FIG. 4) between the reserve port 25 and the JPO4 is preferably the same as or smaller than the capacitor (32D in FIG. 6) between the JPO4 and the signal port (26D in FIG. 6) of the JPO4.

The reserve port 25 may also be used to estimate the resonance frequency $\omega_c$ of the coupler 21. A signal is supplied to the reserve port 25 and its reflection signal is measured. When a frequency of the signal supplied matches the resonance frequency $\omega_c$ of the coupler 21, the signal supplied is absorbed by the coupler 21 and a reflectance decreases. The coefficient of the four-body interaction $g^{(4)}$ also depends on the resonance frequency $\omega_c$ of the coupler 21. Therefore, estimation of the frequency of the coupler 21 is important to ensure proper operation.

In the coupler 21, the non-linear element 10 connected between the first electrode 16-1 and the second electrode 16-2 is, as a matter of course, not limited to the Josephson junction 11. The non-linear element 10 may be, for example, a SQUID. In this case, a bias line maybe provided to supply a direct current (DC) and to apply a bias flux to the SQUID. Alternatively, the non-linear element 10 may include a loop structure having a plurality of (e.g., three or more) Josephson junctions.

Figure 5:
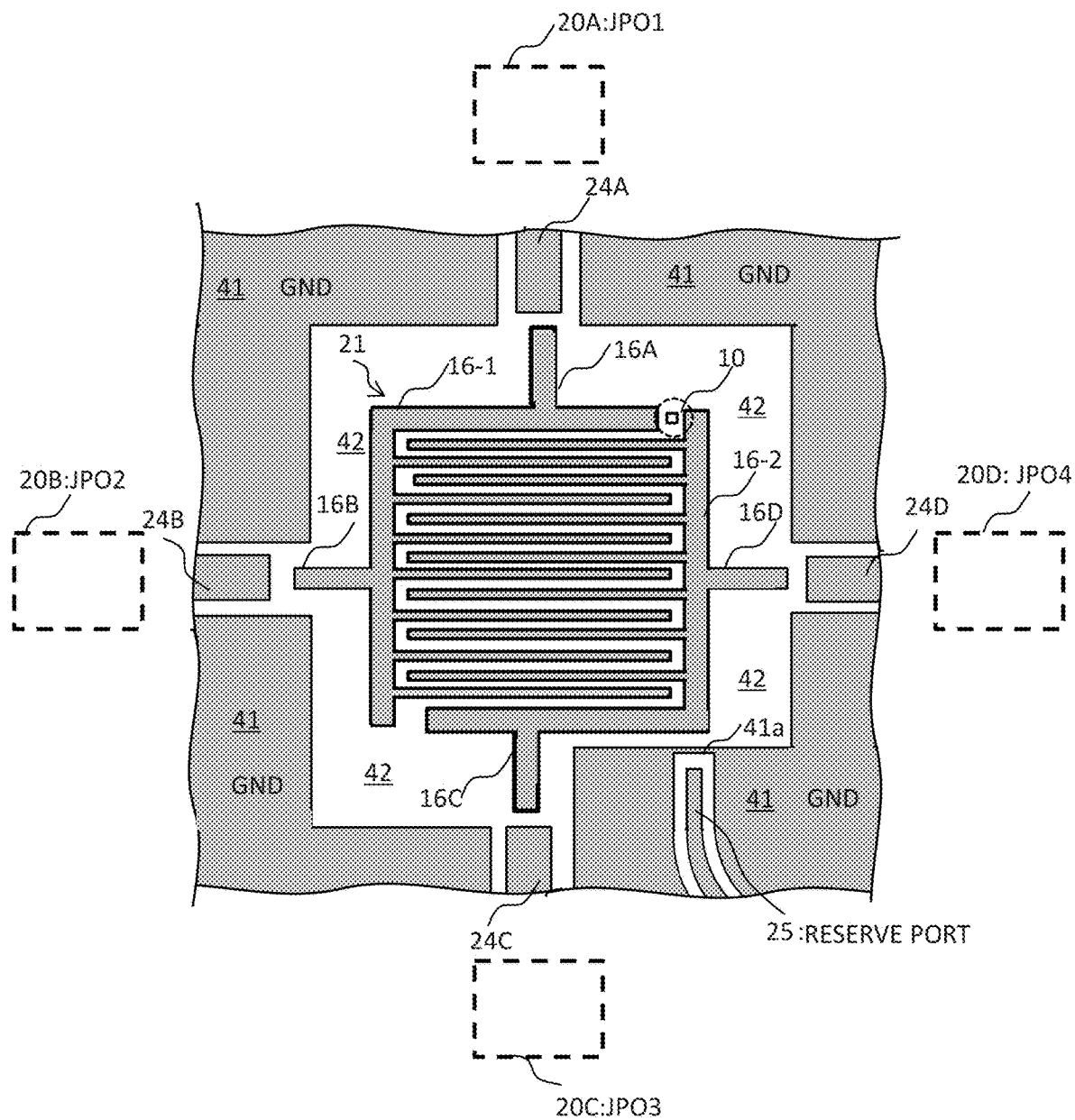
FIG. 5 is a diagram schematically illustrating one of examples of a layout of the present disclosure.

FIG. 5 is a diagram schematically illustrating an example (a non-limiting example) of a wiring pattern (layout) on the coupler 21 and its neighborhood illustrated in FIG. 4. In FIG. 5, the same elements illustrated in FIG. 2 are designated by the same reference numerals (or signs) and description thereof will be omitted to avoid duplication. Referring to FIG. 5, an end portion of a coplanar transmission line (signal line) forms the reserve port 25. The coplanar transmission line is elongated with both sides of longitudinal direction thereof sandwiched between the ground planes 41 via gaps. The end portion of the reserve port 25 faces the bottom member of the second electrode 16-2 of the coupler 21 via a gap 42 and is capacitively coupled to the second electrode 16-2. In FIG. 5, a narrow (linear) ground 41a, which is flush with an edge of the ground plane 41, is interposed between the end portion of the reserve port 25 and the bottom member of the second electrode 16-2. However, the ground 41a can be removed and the end portion of the reserve port 25 can be configured as an open end, with the end portion directly facing the bottom member of the second electrode 16-2. Signal transmission by a capacitive coupling is performed between the end portion of the reserve port 25 and the second electrode 16-2. For this reason, the width of the gap 42 between the edge of the ground plane 41 (GND) on both sides of the reserve port 25 and the bottom member of the second electrode 16-2 is made narrower than the width of the gap 42 between the edge of the ground plane 41 (GND) and the bottom member of the second electrode 16-2 illustrated in FIG. 2.

As described below, the JPO includes a pump line and a signal line. The pump line is configured to be inductively coupled to the SQUID of the JPO. A DC current and a pump signal are supplied to the pump line to induce a Josephson parametric oscillation in the JPO. The signal line is capacitively coupled to the JPO to apply a coherent drive corresponding to a local magnetic field to be applied to the JPO.

The coherent drive has a frequency approximately half of the frequency $\omega_{p,i}$ of a parametric excitation of the i-th (i=1-4) JPO. Therefore, a signal, which is originally intended to be used as a coherent drive, may be used for the reserved signal. A switch 51 may be provided on the signal line path connected to a signal source (microwave signal generator) with a frequency of $\omega_{p,i}$, so as to select, as an output destination for the signal, either the signal port 26 capacitively coupled to the JPO or the reserve port 25 capacitively coupled to coupler 21.

Figure 6:
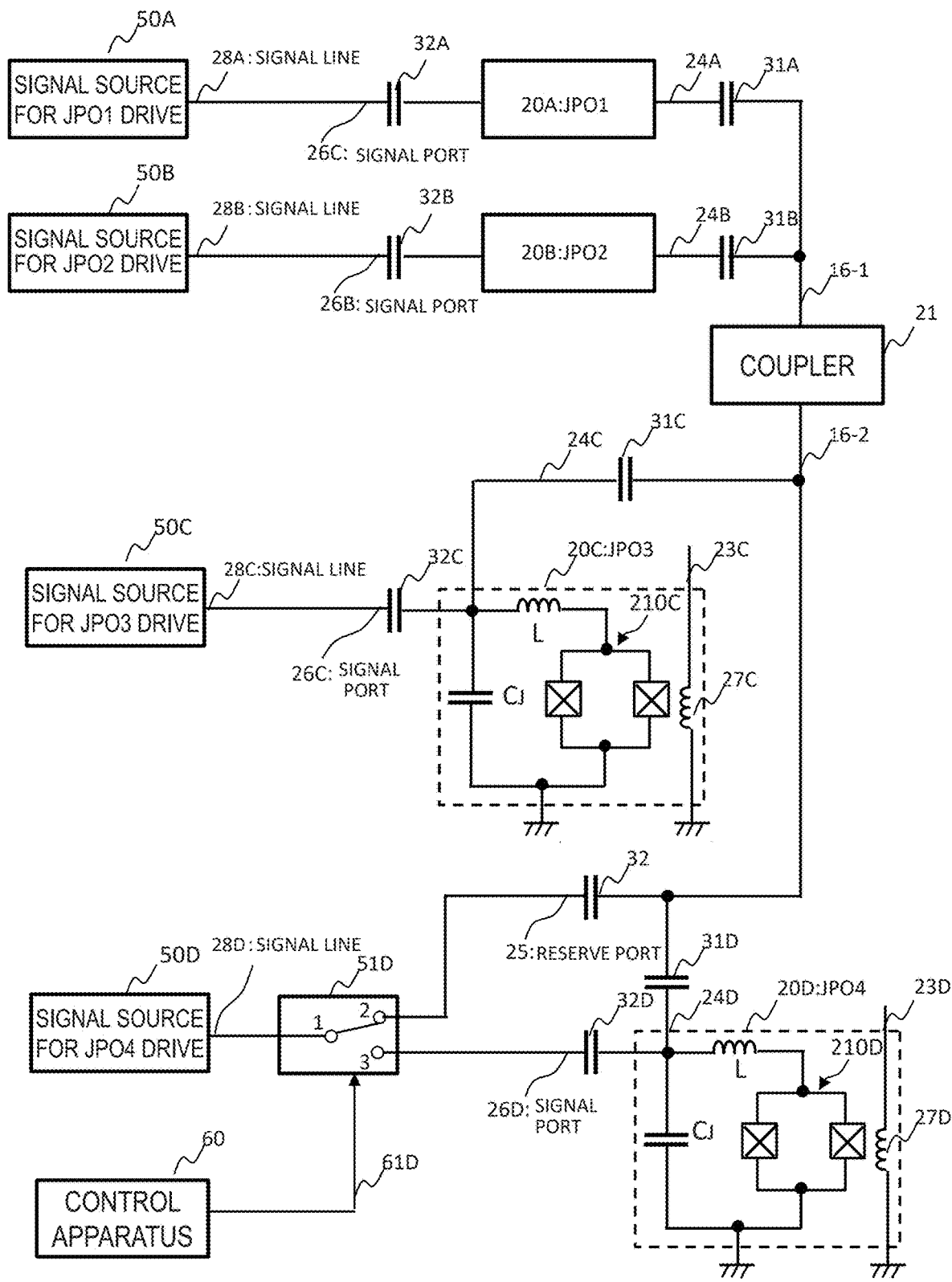
FIG. 6 is a diagram schematically illustrating one of examples of a configuration of the present disclosure.

FIG. 6 is a diagram illustrating the example embodiment. In FIG. 6, JPO3 (20C) and JPO4 (20D) are illustrated with pump lines 23C and 23D and magnetic field application parts 27C and 27D. The pump lines 23C and 23D transmit the pump signal. The magnetic field application parts 27C and 27D generate magnetic flux that penetrates through the loops of the SQUIDs 210C and 210D in JPO3 (20C) and JPO4 (20D). As a pump signal, a signal may be composed by a microwave signal of frequency $\omega_p$, which is about twice the resonance frequency of JPO3 (20C) and JPO4 (20D), combined with a DC current. In JPO3 (20C) and JPO4 (20D), one end of each of the SQUIDs 210C and 210D is connected to ground, and one end of each of capacitors Cis (capacitance between one end of each of electrodes of JPO3 and JPO4 and ground) is connected to ground. The other ends of the SQUIDs 210C and 210D are connected to the other ends of capacitors $C_j$s via inductors L (electrodes of JPO3 and JPO4), connected to the coupler connection parts 24C and 24D, and further to the signal ports 26C and 26D via capacitors 32C and 32D, respectively. JPO1 (20A) and JPO2 (20B) also have the same configuration.

Signal ports 26A, 26B, and 26C correspond to end portions of signal lines (signal transmission lines: IO lines) 28A, 28B, and 28C, respectively, which transmit signals to drive JPO1, JPO2, and JPO3 from signal sources (microwave signal generators) 50A, 50B, and 50C, respectively.

The signal source 50D (signal source, for JPO4 drive) which supplies a signal to drive JPO4 is connected to the signal port 26D or the reserve port 25 via a switch (microwave switch) 51D (e.g., single-throw bipolar mechanical (relay) switch) disposed on a signal line 28D. The switch 51D may be configured to be disposed in a dilution refrigerator, as with the superconducting quantum circuit 1.

The switch 51D has a first terminal connected to the signal source 50D and has a second and third terminals connected to the signal port 26D and the reserve port 25, respectively. The switch 51D switches a connection destination of the signal source 50D between the signal port 26D and the reserve port 25 based on a control signal 61D supplied from a control apparatus 60. The control apparatus 60 may be configured to be disposed outside (room temperature) of the dilution refrigerator, as with the signal sources (microwave signal generators) 50A, 50B, 50C and 50D.

The reserve port 25 is capacitively coupled to the second electrode 16-2 of the coupler 21 via the capacitor 32. The switch 51D connects the signal source 50D for JPO4 (20D) to the signal port 26D side during normal operation of JPO4 (20D). When JPO4 (20D) is missing, the switch 51D connects the signal source 50D for JPO4 to the reserve port 25. In this case, a supply of the pump signal to the pump line 23D of JPO4 (20D) is stopped.

The reserve port 25 can cope with missing of either JPO4 (20D) or JPO3 (20C). That is, the reserve port 25 can be used to compensate for missing of JPO3 (20C) or JPO4 (20D).

According to one of the examples of the present disclosure, when there is a missing qubit (JPO), a destination of signal supplied from the signal source to drive the missing qubit (JPO) is switched from the signal port of the missing qubit (JPO) to the reserve port 25, which enables continuous operation of the quantum annealing machine to contribute to enhance availability and fault tolerance.

Figure 7:
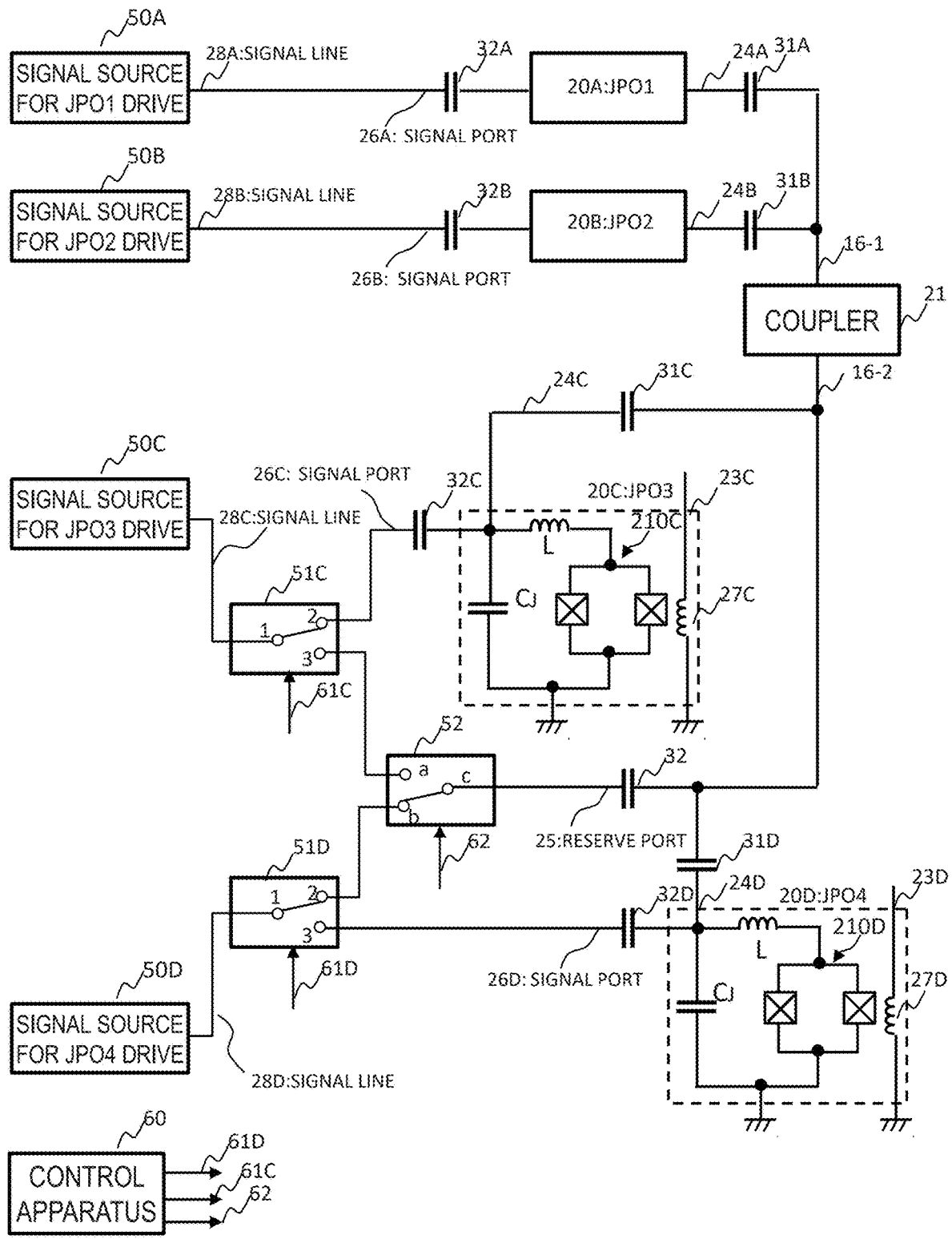
FIG. 7 is a diagram schematically illustrating one of examples of a configuration of the present disclosure.

FIG. 7 illustrates a variation example of the present disclosure, in which a signal from the signal source to drive JPO3 can also be supplied to the reserve port 25 in the configuration illustrated in FIG. 6. Referring to FIG. 7, a switch 51D and a switch 51C are disposed on the signal source 50D for driving JPO4 and on the signal line of the signal source 50C for driving JPO3, respectively. A first terminal of the switch 51D is connected to the signal source 50D (signal source for JPO4 drive) and second and third terminals thereof are connected to the signal port 26D and a b-terminal of a switch 52, respectively. The switch 51D connects the signal source 50D either to the signal port 26D or to the b-terminal of the switch 52 based on a control signal 61D supplied from the control apparatus 60. A first terminal of the switch 51C is connected to the signal source 50C (signal source for JPO3 drive), and second and third terminals of the switch 51C are connected to the signal port 26C and a a-terminal of the switch 52, respectively. The switch 51C connects the signal source 50C to the signal port 26C or the a-terminal of the switch 52 based on a control signal 61C supplied from the control apparatus 60.

The switch 52 connects either the a-terminal or the b-terminal to a c-terminal connected to the reserve port 25, based on a control signal 62 supplied from the control apparatus 60. The switches 51C, 51D, and 52 may each be configured as a bidirectional switch. The signal source 50D and the signal source 50C may include a readout circuit (such as a spectrum analyzer, not shown) to monitor a reflection signal (reflection signal of a signal supplied to the coupler 21) from the reserve port 25 via the switch 52, switch 51D, or switch 51C.

Figure 8:
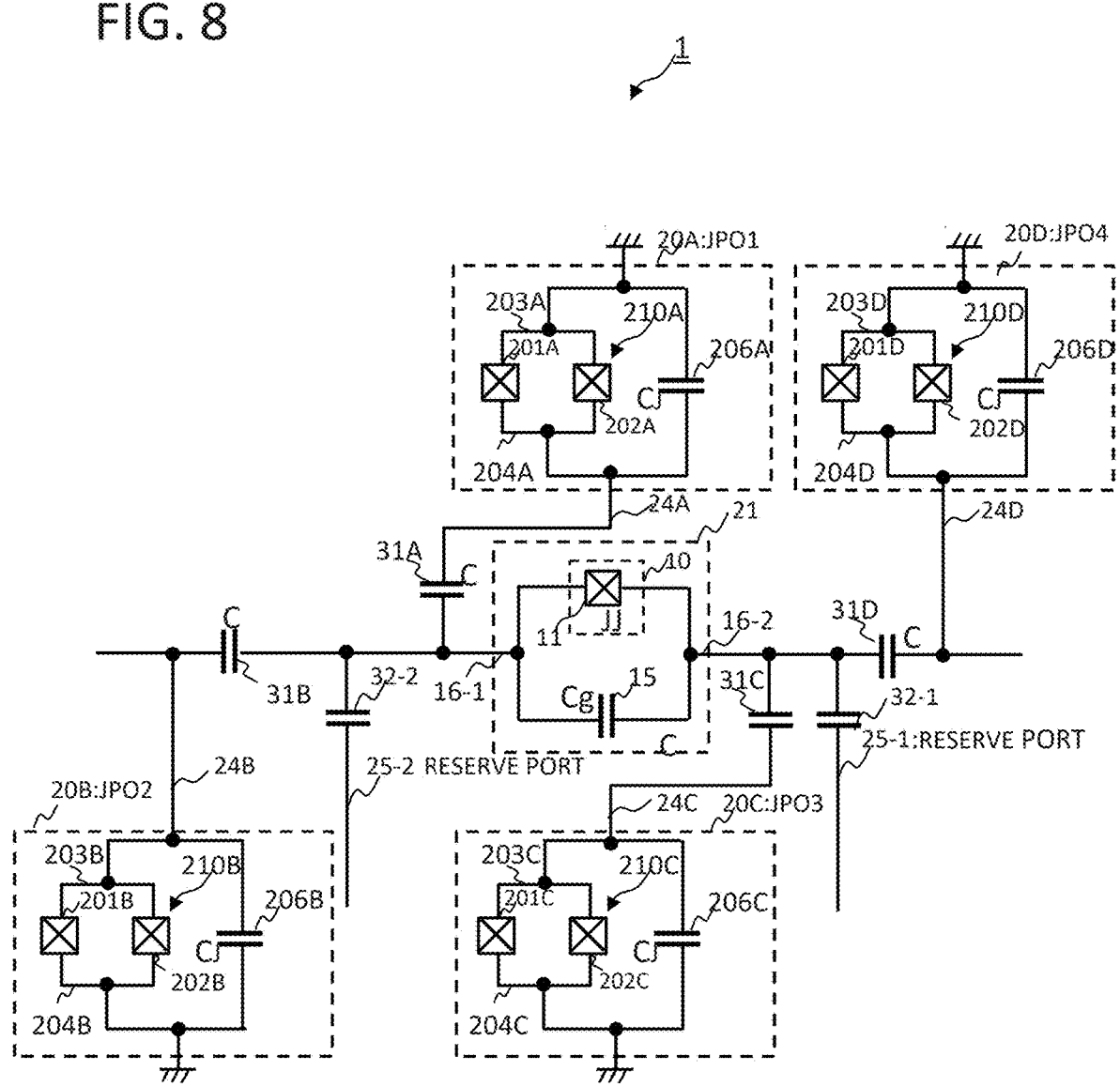
FIG. 8 is a diagram schematically illustrating one of examples of a circuit configuration of the present disclosure.

FIG. 8 illustrates a further variation example of the present disclosure. In FIG. 8, description of elements that overlap with FIG. 4 are omitted. Referring to FIG. 8, the superconducting quantum circuit 1 includes a reserve port 25-2 in addition to a reserve port 25-1 (corresponding to the reserve port 25 in FIG. 4). The reserve port 25-1 is capacitively coupled to the second electrode 16-2 of the coupler 21 via a capacitor 32-1. The reserve port 25-2 is capacitively coupled to the first electrode 16-1 of the coupler 21 via a capacitor 32-2. JPO1 (20A) and JPO2 (20B) are capacitively coupled to the first electrode 16-1 via the capacitors 31A and 31B, respectively. The capacitor 32-2 is connected to the first electrode 16-1 in parallel with these capacitors 31A and 31B. In FIG. 8, the reserve port 25-2 corresponds to a missing in either JPO1 (20A) or JPO2 (20B). When JPO1 (20A) or JPO2 (20B) is missing due to failure or other reasons, a signal (microwave) is supplied to the reserve port 25-2 from a signal source (not shown). As a result, the reserve port 25-2 functions as a substitute for JPO1 (20A) or JPO2 (20B). As a result, JPO2 (20B), JPO3 (20C), and JPO4 (20D) are effectively four-body coupled via the coupler 21, or JPO1 (20A), JPO3 (20C), and JPO4 (20D) are effectively four-body coupled via the coupler 21.

Figure 9:
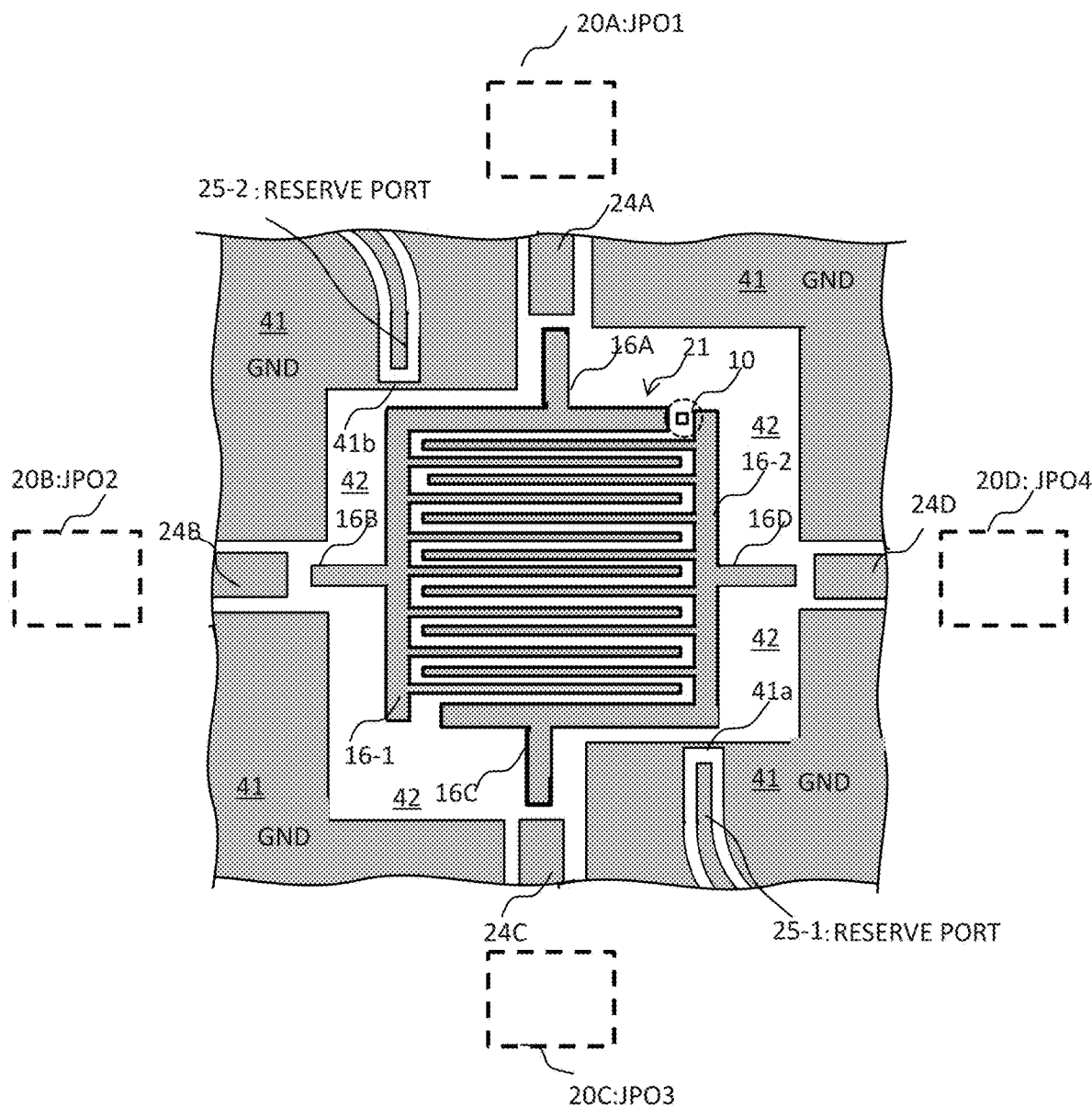
FIG. 9 is a diagram schematically illustrating one of examples of a layout of the present disclosure.

FIG. 9 schematically illustrates an example (a non-limiting example) of a wiring pattern (layout) on the coupler 21 and its neighborhood illustrated in FIG. 8. In FIG. 9, the same elements illustrated in FIG. 2 are designated by the same reference numerals (or signs) and description thereof will be omitted to avoid duplication. Referring to FIG. 9, the end portion of the first reserve port 25-1 faces a narrow (linear) ground 41a and further faces the bottom member of the second electrode 16-2 of the coupler 21 via a gap 42. An end portion of the second reserve port 25-2 faces a narrow (linear) ground 41b and further faces the top member of the first electrode 16-1 of the coupler 21 via a gap 42. The first reserve port 25-1 corresponds to the reserve port 25 in FIG. 5. The description of the first reserve port 25-1 may be referred to that of the reserve port 25 in FIG. 5. The narrow (linear) ground 41b, which is flush with an edge of the ground plane 41, is interposed between the end portion of the second reserve port 25-2 and the top member of the first electrode 16-1. There may be such a configuration in which the ground 41b is removed and the end portion of the second reserve port 25-2 is configured as an open end, with the end portion directly facing the top member of the first electrode 16-1. Signal transmission by a capacitive coupling is performed between the end portion of the second reserve port 25-2 and the first electrode 16-1. For this reason, the width of the gap 42 between the edge of the ground plane 41

(GND) on both sides of the second reserve port 25-2 and the top member of the first electrode 16-1 is narrower than the width of the gap 42 between the edge of the ground plane 41 (GND) and the top member of the first electrode 16-1 illustrated in FIG. 2.

Figure 10:
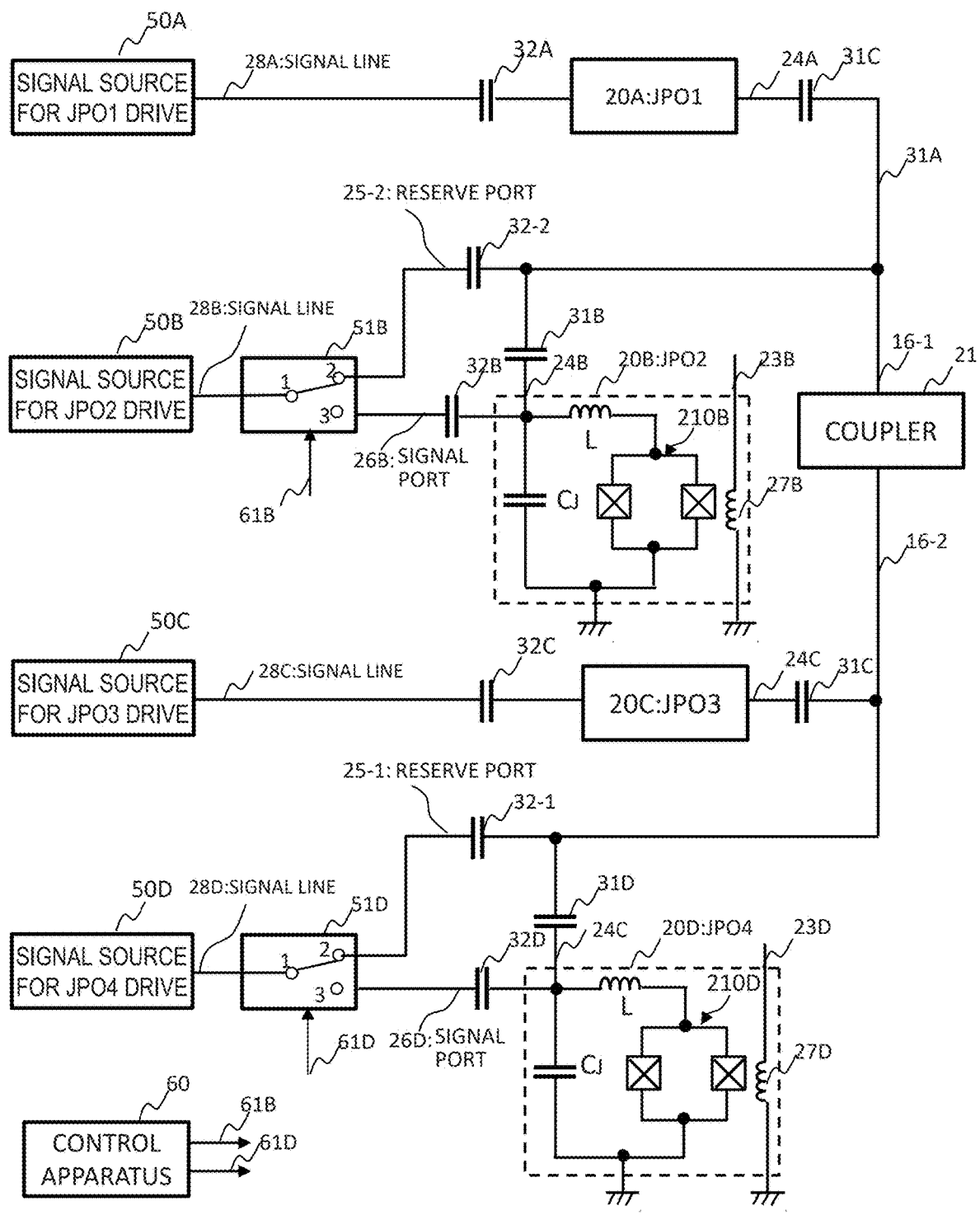
FIG. 10 is a diagram schematically illustrating one of examples of a configuration of the present disclosure.

FIG. 10 illustrates an example of a configuration illustrated in FIG. 8. The signal source 50B (signal source for JPO2 drive) is connected to the signal port 26B or the second reserve port 25-2 via a switch 51B (single-throw bipolar switch) disposed on a signal line 28B. The signal source 50D (signal source for JPO4 drive) is connected to the signal port 26D or the first reserve port 25-1 via the switch 51D (single-throw bipolar switch) disposed on a signal line 28D.

Signal path switching in the switch 51B or the switch 51D is performed by a control signal 61B and a control signal 61D supplied from the control apparatus 60, respectively. The reserve port 25-2 is capacitively coupled to the first electrode 16-1 of the coupler 21 via a capacitor 32-2. The switch 51B connects the signal source 50B for driving JPO2 (20B) to the signal port 26B side during normal operation of JPO2 (20B) When JPO2 (20B) is missing, the switch 51B connects the signal source 50B to the second reserve port 25-2. Since the switch 51D is the same as the switch 51D in FIG. 6, the description thereof is omitted.

As one of variation examples of the configuration of FIG. 10, a signal may be supplied to the first reserve port 25-1 from either the signal source 50C (signal source for JPO3 drive) or the signal source 50D (signal source for JPO4 drive) as illustrated in FIG. 7. A signal may also be supplied to the second reserve port 25-2 from either the signal source 50A (signal source for JPO1 drive) or the signal source 50B (signal source for JPO2 drive).

In FIG. 10, switches may be provided on signal lines 28A and 28C of the signal source 50A (signal source for JPO1 drive) and the signal source 50C (the signal source for JPO3 drive), respectively, as in the JPO2 and the JPO4. In this case, when at least one of JPO1 (20A) and JPO3 (20C) is missing, the signal source 50A and/or the signal source 50C are connected to the reserve port.

Instead of using a physical bit(s) (JPO(s)) of fixed bit(s) "Fixed" in the bottom row of FIG. 3B, a reserve port(s) as described above may be provided and a signal(s) may be supplied from a signal source(s) to the reserve port(s). In this case, oscillation of the physical bit(s) (JPO(s)) of the fixed bit(s) is unnecessary (feeding signals to a pump line(s) and a signal line(s) provided for the JPO(s) is unnecessary). Thus, in a situation where a signal may be fed to the coupler as an alternative of a fixed bit, while retaining a possibility of usage of the JPO as the fixed, oscillation of the JPO of the fixed bit may be stopped to reduce noise generation. That is, by stopping feeding signals to the pump line and the signal line provided for the JPO, crosstalk to other lines can be reduced. Also, by stopping the oscillation of the JPO itself, the effect on other oscillators can be reduced. These contribute to reduce a probability of malfunction of the quantum circuit.

The above examples of the disclosure can partially or entirely be described as following Supplementary notes (Notes), though not limited thereto.

(Note 1) A superconducting quantum circuit apparatus, includes: a coupler; coupling ports; a plurality of qubits coupled to the coupler via the coupling ports, respectively; and a reserve port that is a spare coupling port to be coupled to the coupler separately from the coupling ports.

(Note 2) The superconducting quantum circuit apparatus according to Note 1, further includes a switch that switches a connection destination of a signal source between a signal port of the qubit and the reserve port.

(Note 3) In the superconducting quantum circuit apparatus according to Note 1 or 2, there are provided one or more reserve ports for each predetermined one or more qubits. Alternatively, there is provided one reserve port in common for adjacent pairs of qubits.

(Note 4) The superconducting quantum circuit apparatus according to Note 1 or 2, further includes: a first to third switches, wherein the first switch switches a connection destination of a first signal source between a signal port of a first qubit and a first terminal of the third switch, the first qubit being one of the plurality of qubits, the second switch switches a connection destination of a second signal source between a signal port of a second qubit and a second terminal of the third switch, the second qubit being one of the plurality of qubits, the third switch connects the first terminal or the second terminal to a third terminal connected to the reserve port.

(Note 5) In the superconducting quantum circuit apparatus according to Note 1 or 2, the coupler includes: a first electrode and a second electrode arranged facing each other, and a non-linear element bridging between the first electrode and the second electrode. A first qubit and a second qubit are capacitively coupled to the first electrode via a first coupling port and a second coupling port, respectively. A third qubit and a fourth qubit are capacitively coupled to the second electrode via a third coupling port and a fourth coupling port, respectively. The reserve port is disposed for at least one of the first to fourth qubits, the reserve port being capacitively coupled to the coupler.

(Note 6) The superconducting quantum circuit apparatus according to Note 5, further includes: a switch that switches a connection destination of a signal source between a signal port of the qubit and the reserve port, for the at least one qubit of the first qubit and the second qubit, and for the at least one qubit of the third qubit and the fourth qubit, respectively.

(Note 7) The superconducting quantum circuit apparatus according to Note 5 or 6, the non-linear element comprises a Josephson junction or a Superconducting Quantum Interference Device (SQUID) including a plurality of Josephson junctions in a loop.

(Note 8) The superconducting quantum circuit apparatus according to any one of Notes 1 to 7, includes: a quantum annealing machine that includes the coupler and four qubits of the plurality of qubits coupled to the coupler as a unit cell. For a qubit of the four qubits in the unit cell, a signal from the reserve port is supplied to the coupler instead of from the qubit.

(Note 9) In the superconducting quantum circuit apparatus according to Note 8, the signal from the reserve port is supplied to the coupler for the qubit that fixes a state to a fixed value.

(Note 10) In the superconducting quantum circuit apparatus according to any one of Notes 1 to 9, the plurality of qubits includes Josephson Parametric Oscillators.

(Note 11) In the superconducting quantum circuit apparatus according to any one of Notes 1 to 8, a strength of coupling between the reserved port and at least one qubit of the plurality of qubits is less than or equal to strength of coupling between the at least one qubit and the signal port of the at least one qubit.

(Note 12) A control method for a superconducting quantum circuit includes: a coupler; a plurality of coupling ports; and a plurality of qubits coupled to the coupler via the plurality of coupling ports, respectively, the method including:
  arranging a reserve port that is a spare coupling port to be coupled to the coupler, separately from the plurality of coupling ports; and
  supplying a signal to a reserve port instead of to a qubit (which may be missing qubit and/or a qubit to be stopped).

The disclosure of each of NPLs 1 and 2 is incorporated herein by reference thereto. Variations and adjustments of the examples are possible within the scope of the overall disclosure (including the claims) based on the basic technical concept. Various combinations and selections of examples and disclosed elements (including the elements in each of the claims, examples, drawings, etc.) are possible within the scope of the claims of the present application. That is, the present disclosure includes various variations and modifications that could be made by those skilled in the art according to the overall disclosure including the claims and the technical concept.

What is claimed is:

1. A superconducting quantum circuit apparatus comprising:
   a coupler;
   a plurality of coupling ports;
   a plurality of qubits coupled to the coupler via the plurality of coupling ports, respectively; and
   a reserve port provided, as a spare coupling port to be coupled to the coupler, separately from the plurality of coupling ports.

2. The superconducting quantum circuit apparatus according to claim 1, comprising, as the reserve port, one or more reserve ports, each allotted for at least predetermined one qubit.

3. The superconducting quantum circuit apparatus according to claim 1, further comprising:
   a switch that switches a connection destination of a signal source between a signal port of the qubit and the reserve port.

4. The superconducting quantum circuit apparatus according to claim 1, wherein the reserve port is arranged between a first coupling port for a first qubit and a second coupling port for a second qubit.

5. The superconducting quantum circuit apparatus according to claim 4, further comprising:
   a first switch, a second switch, and a third switch,
   wherein the first switch switches a connection destination of a first signal source between a signal port of the first qubit and a first terminal of the third switch,
   the second switch switches a connection destination of a second signal source between a signal port of the second qubit and a second terminal of the third switch, and
   the third switch connects the first terminal or the second terminal to a third terminal thereof connected to the reserve port.

6. The superconducting quantum circuit apparatus according to claim 1, wherein the coupler includes:
   a first electrode and a second electrode arranged opposed to each other, and
   a non-linear element connected between the first electrode and the second electrode,
   wherein a first qubit and a second qubit are capacitively coupled to the first electrode via a first coupling port and a second coupling port, respectively,
   a third qubit and a fourth qubit are capacitively coupled to the second electrode via a third coupling port and a fourth coupling port, respectively, and
   the reserve port is arranged for at least one of the first to fourth qubits, the reserve port being capacitively coupled to the coupler.

7. The superconducting quantum circuit apparatus according to claim 6, further comprising:
   a first switch that switches a connection destination of a signal source between a signal port of at least one of the first qubit and the second qubit and a first reserve port provided for at least one of the first qubit and the second qubit; and
   a second switch that switches a connection destination of a signal source between a signal port of the at least one of the third qubit and the fourth qubit and a second reserve port provided for the at least one of the third qubit and the fourth qubit.

8. The superconducting quantum circuit apparatus according to claim 6, wherein the non-linear element comprises
   a Josephson junction or a Superconducting Quantum Interference Device (SQUID) including a plurality of Josephson junctions arranged in a loop.

9. The superconducting quantum circuit apparatus according to claim 1, wherein the qubit comprises
   a Josephson parametric oscillator (JPO).

10. The superconducting quantum circuit apparatus according to claim 1, comprising:
    a quantum annealing machine that includes
    four qubits coupled to the coupler, as a unit cell, wherein
    a signal from the reserve port, in place of the qubit, is supplied to the coupler.

11. The superconducting quantum circuit apparatus according to claim 10, wherein the signal from the reserve port is supplied to the coupler, in place of the qubit with a state thereof fixed to a fixed value.

12. A control method for a superconducting quantum circuit that includes: a coupler; a plurality of coupling ports; and a plurality of plurality of qubits coupled to the coupler via the plurality of coupling ports, respectively, the method including:
    arranging a reserve port, as a spare coupling port to be coupled to the coupler, separately from the plurality of coupling ports; and
    supplying a signal to the reserve port, instead of to the qubit.

* * * * *